United States Patent [19]

Nosu et al.

[11] 4,244,045
[45] Jan. 6, 1981

[54] OPTICAL MULTIPLEXER AND DEMULTIPLEXER

[75] Inventors: Kiyoshi Nosu, Yokohama; Hideki Ishio; Tetsuya Miki, both of Yokosuka, all of Japan

[73] Assignee: Nippon Telegraph and Telephone Public Corporation, Tokyo, Japan

[21] Appl. No.: 8,161

[22] Filed: Jan. 31, 1979

[30] Foreign Application Priority Data

Jan. 31, 1978 [JP] Japan ................................. 53/8873

[51] Int. Cl.³ .......................................... H04B 9/00
[52] U.S. Cl. ........................................ 370/3; 455/612; 455/617
[58] Field of Search .................... 250/199; 358/50; 350/172; 370/3; 455/612, 617

[56] References Cited

U.S. PATENT DOCUMENTS

| | | | |
|---|---|---|---|
| 3,403,260 | 9/1968 | Geusic | 350/172 |
| 3,623,797 | 11/1971 | Daw | 350/172 |
| 3,703,640 | 11/1972 | Broussaud | 250/199 |
| 3,953,727 | 4/1976 | d'Auria | 250/199 |
| 4,001,577 | 1/1977 | Albanese | 250/199 |

*Primary Examiner*—Howard W. Britton
*Attorney, Agent, or Firm*—Armstrong, Nikaido, Marmelstein & Kubovcik

[57] ABSTRACT

An optical multiplexer and/or optical demultiplexer for multiplexing and/or demultiplexing a plurality of wavelengths comprises a plurality of optical filters each of which transmits a predetermined wavelength and reflects other wavelengths, said optical filters being arranged so that an optical beam is transmitted or reflected via each optical filter in sequence in a zigzag fashion. A light source or light detector is provided behind each optical filter to project or receive a collimated optical beam. The angle of incidence when a beam is applied to an optical filter is small. And, another optical means is provided to connect the present optical multiplexer and/or demultiplexer with an outside optical fiber. The transmission wavelength of each optical filter is different from the others.

20 Claims, 17 Drawing Figures

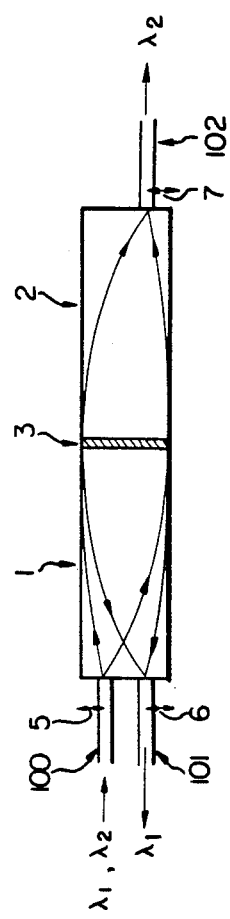
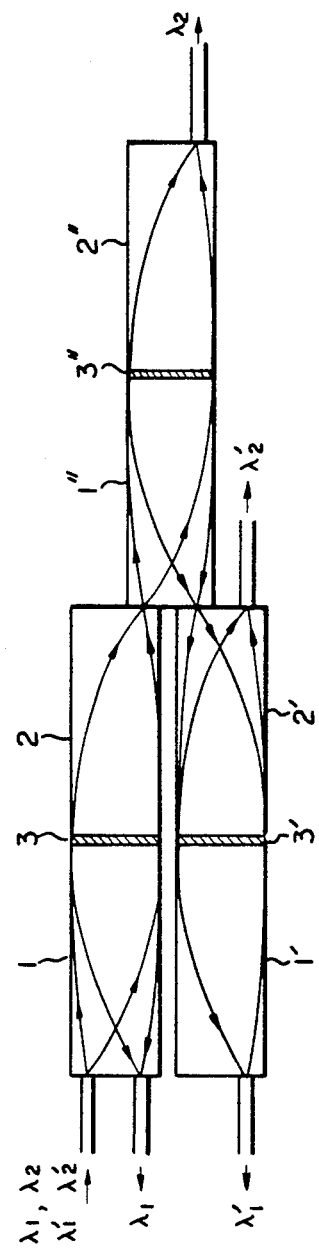

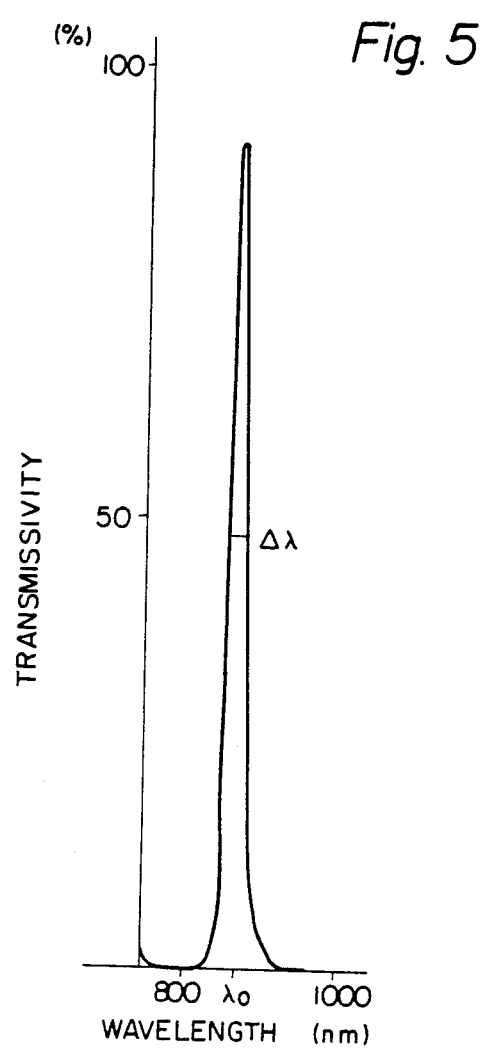

OPTICAL MULTIPLEXER AND DEMULTIPLEXER

BACKGROUND OF THE INVENTION

The present invention relates to an optical multiplexer and/or an optical demultiplexer which can be utilized for spectroscopic analysis in optical equipment, and/or combining and/or separation of optical signals in wavelength-division multiplexing transmission system.

A telcommunication system utilizing an optical fiber transmission system has the advantages over prior metallic cables, such as small loss, wide bandwidth, small cable diameter, light-weight cable, high-flexibility cable, no cross talk characteristic, and immunity to electromagnetic interference. And the latest developments for manufacturing optical fiber with low loss, and for controlling the wavelength in light sources, makes possible a wavelength-division multiplexing transmission system which transmits a plurality of wavelengths in a single optical fiber. This technology not only increases the transmission capacity of an optical fiber, but also makes possible a two-way transmission system and/or simultaneous transmission of a plurality of different signals.

FIG. 1 shows an example of the basic configuration of a wavelength-division multiplexing transmission system (called W.D.M.). In this figure, the signals of a plurality of channels ($CH_1$, $CH_2$, ..., $CH_n$) at the transmission side are converted to a driving signals for driving light sources by respective transmitter circuits ($TR_1$, $TR_2$, ..., $TR_n$), and are applied to light sources ($T_1$, $T_2$, ..., $T_n$). Each light source generates a light beam according to said driving signals and each of said light beams has the center wavelength ($\lambda_1$, $\lambda_2$, ..., $\lambda_n$), and each of said center wavelengths corresponds to a different channel. As a light source a laster or a light-emitting-diode (LED) can be generally utilized. The output light beams from the light sources are applied to an optical multiplexer (MUL) through an optical fiber and are multiplexed or combined therein, then the multiplexed light beams are applied to an optical fiber transmission line (LINE).

At the reception side, each wavelength is separated from the others by an optical demultiplexer (DE-MUL), and each separated light beam is applied to each light detector or sensor ($R_1$, $R_2$, ..., $R_n$), which converts the optical signal to an electrical signal. Said electrical signal is applied to a corresponding output terminal through a receiver circuit ($REC_1$, $REC_2$, ..., $REC_n$).

It should be appreciated that, in a two-way WDM transmission system, both the light sources and the light detectors are provided at both the transmission side and the reception side.

The present invention provides an optical multiplexer and/or an optical demultiplexer utilized as mentioned above as an example. It should be noted that due to the reversibility of a light beam, the structure of an optical multiplexer is the same as the structure of an optical demultiplexer. Accordingly, it should be noted that the word "multiplexer" or "demultiplexer" involves both a multiplexer and a demultiplexer unless a specific definition is given.

Some of the prior devices which can be utilized as an optical multiplexer are a prism, an optical grating, and a wavelength-selective filter. A prism and an optical grating are wavelength selective devices which utilize the relationship between the wavelength and the refractive index, or diffraction angle of a prism or an optical grating, respectively.

A wavelength selective filter reflects a specific wavelength and transmits other wavelengths, and is embodied by plastics with coloring matter or dye, or a laminated thin film interference filter in which thin film multi-layers are attached on a glass substrate through vacuum evaporation.

A graded index rod lens has a radial index profile of the refractive index as shown below.

$$N(r) = N_0(1 - (A^2/2)r^2)$$

where $N(r)$ is the refractive index at the point of the radius (r), $N_0$ is the center refractive index, A is a constant, and r is the length from the center. When a light beam is applied to the center of the rod in the axial direction, the diameter of the beam changes periodically, and when a light beam is applied to a portion other than the center of the rod, the light beam goes in a zigzag fashion. The combination of the above characteristics of a rod lens and an interference thin film filter provides an optical multiplexer.

This optical multiplexer has a structure as shown in FIG. 2, in which an interference filter 3 is sandwiched between a pair of graded index rod lenses 1 and 2. The light beam coming into the graded index rod lens proceeds in a zigzag fashion through the graded index rod lens as shown by the arrow in the figure. When used as an optical multiplexer, the lengths of the graded index rod lenses 1 and 2 are designed to be about ¼ of the zigzag pitch of the light beam. The interference thin film filter 3 is a reflection film made of dielectric multi-layer film with a wavelength dependency characteristic, that is, reflectivity and transmissivity of this film differs depending on the wavelength of the light The following is a description of signals with two different wavelengths $\lambda_1$, and $\lambda_2$, introduced into the optical fiber 100, and separated into two different positions. The optical signal waves of two different wavelengths emitted from the optical fiber 100 proceed zigzag and propagate through the graded index rod lens 1 and enter the interference filter 3. Then, the interference filter 3 reflects the optical signal wave with wavelength $\lambda_1$ but transmits the optical signal wave with wavelength $\lambda_2$. The optical signal wave with wavelength $\lambda_1$ is reflected and enters the optical fiber 101. The optical signal wave with wavelength $\lambda_2$ propagates through the graded index rod lens 2 and is introduced into the optical fiber 102. Therefore, the two optical signal waves with different wavelengths can be separated. The characteristics of the interference filter 3 as a multiplexer are determined by the position 5 of the fiber 100. The positions 6 and 7 of the optical fibers 101 and 102 which receive the separated signal waves are also determined by the position 5 of the optical fiber 100. Therefore, the optical multiplexer as shown in FIG. 2 has the disadvantage that the characteristics of the interference filter 3 and the positions of the fibers 101 and 102 for reception of the waves cannot be adjusted independently.

When three or more waves are to be separated, the configuration shown in FIG. 3 is utilized. In this case, a plurality of graded index rod lenses 1, 2, 1', 2', 1'', 2'' are assembled. However, loss will be great if connecting positions of these graded index rod lenses are not controlled with precision. The larger the number of signal waves to be separated, the greater the adjustment difficulties.

Another prior optical multiplexer utilizing a wavelength selective mirror is disclosed in the U.S. Pat. No. 3,953,727. According to said U.S. patent, a plurality of selective mirrors oriented at 45 degrees in relation to the axis of the light beam are arranged in a cascaded configuration, and each selective mirror reflects a specific wavelength. Accordingly, when there are many wavelengths to be multiplexed or demultiplexed, a light beam must pass many selective filters, therefore, the transmission loss is great. Further, said U.S. patent has the disadvantage that when the wavelength to be separated is near to that of the other wavelength, separation is impossible since the angle of incidence is as large as 45 degrees, and the transmission and/or reflection characteristics of that filter depends upon whether the light beam is P-polarized light or S-polarized light.

Said U.S. patent also discloses a multiplexer in which a plurality of band pass filters are arranged around a glass plate with semi-reflective walls. However, this multiplexer has the disadvantage that the loss of the light beam is great since the light beam suffers from a plurality of partial reflections or partial transmission in said semi-reflective walls.

SUMMARY OF THE INVENTION

It is an object, therefore, of the present invention to overcome the disadvantages and limitations of prior multiplexer and/or demultiplexer by providing a new and improved optical-multiplexer and/or demultiplexer.

It is also an object of the present invention to provide a multiplexer and/or demultiplexer in which the insertion loss is small, the angle of incidence is small, and many signals can be multiplexed.

The above and other objects are attained by an optical multiplexer and demultiplexer comprising at least one optical filter which transmits a predetermined wavelength and reflects other wavelengths, said optical filter being arranged so that an optical beam is transmitted or reflected by said optical filter in sequence in a zigzag fashion, means for projecting or receiving a collimated optical beam to or from the first optical filter with a small angle of incidence, a light source or a light detector positioned behind each optical filter, means for connecting the output of the final optical filter to an external optical fiber, and the transmission wavelength depending upon each specific optical filter.

BRIEF DESCRIPTION OF THE DRAWINGS

The foregoing and other objects, features, and attendant advantages of the present invention will be appreciated as the same become better understood by means of the following description and accompanying drawings wherein;

FIG. 2 shows the structure of a prior optical multiplexer, FIG. 3 shows the structure of another prior optical multiplexer, FIG. 5 shows the relationship between the wavelength and the transmissivity of the filter in FIG. 4.

DESCRIPTION OF THE PREFERRED EMBODIMENTS

Figure 1:
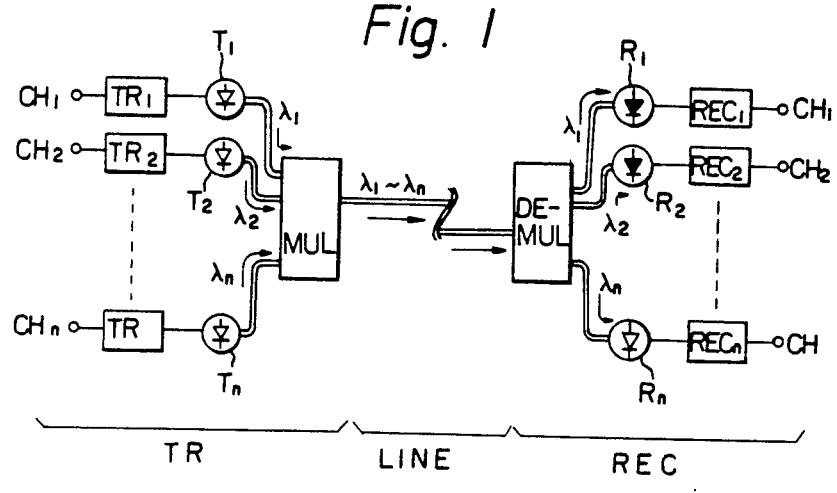
FIG. 1 shows the general view of a wavelength division multiplex communication system utilizing the present invention.
Figure 4:
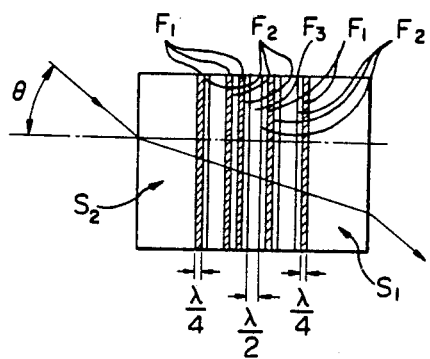
FIG. 4 shows the structure of a dielectric thin film filter utilized in the present invention.

FIG. 4 shows the embodiment of the structure of the dielectric thin film filter, which has a laminated structure, comprising a plurality of the first laminated layers with $F_1$ and $F_2$, the second signal layer with $F_3$ and the third laminated layers with $F_1$ and $F_2$. The layer $F_1$ is made of $Z_nS$ and has the thickness $\lambda/4$, the layer $F_2$ is made of $M_g F_2$ and has the thickness $\lambda/4$, and the layer $F_3$ is made of $Z_nS$ and has the thickness $\lambda/2$. Preferably, the first laminated layer with $F_1$ and $F_2$ has about ten $F_1$ layers and the same number of $F_2$ layers alternatively, and the third laminated layers with $F_1$ and $F_2$ have the same structure as the first layers. Preferably, those layers are attached to a glass substrate $S_1$, and the surface of the layers is covered with a protection layer or cover glass $S_2$. The dielectric thin film filter mentioned above provides the bandpass characteristic in which the specified wavelength $\lambda$ among the input light beam transmits, and another wavelengths are reflected. The adjustment of the thickness of the layers $F_1$, $F_2$ and $F_3$ can control the passband of the filter as desired. Further, when a light beam is applied to a filter obliquely with some angle $\theta(\theta\neq0)$ of incidence, the pass-band (or a center wavelength) of a filter is determined according to the thickness of the layers in the direction of the light beam. Therefore, the passband for an oblique light beam is different from that for a perpendicular light beam. It should be noted in the explanation hereinafter that the present multiplexer has the feature that the angle of incidence is small.

FIG. 5 illustrates an example of measuring the wavelength characteristics of transmissivity of the dielectric thin film filter having bandpass characteristic in FIG. 4 according to the present invention. In FIG. 5, the horizontal axis indicates wavelength and the vertical axis transmissivity. In this example, the center wavelength $\lambda_0$ is 875 nm, and the half width $\Delta\lambda$ is 20 nm. The half width $\Delta\lambda$ is the wavelength width in which the energy decreases by 3dB compared with the center wavelength. Of course the wavelengths which do not transmit are reflected.

Figure 6:
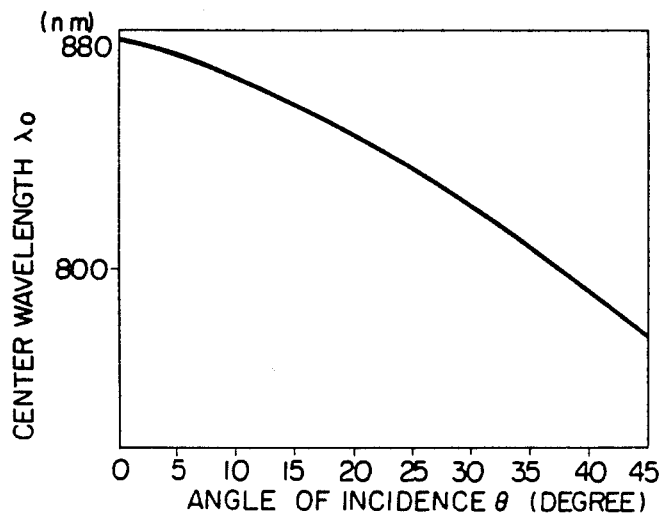
FIG. 6 shows the curve between the center wavelength of the filter and the angle of incidence of the filter in FIG. 4.

FIG. 6 illustrates an example of the relationship between the center wavelength $\lambda_0$ of the bandpass filter and the angle of incidence of a light beam. As apparent from FIG. 6, the larger the angle of incidence $\theta$, the more the center wavelength $\lambda_0$ shifts to the shorter wavelength side.

Figure 7:
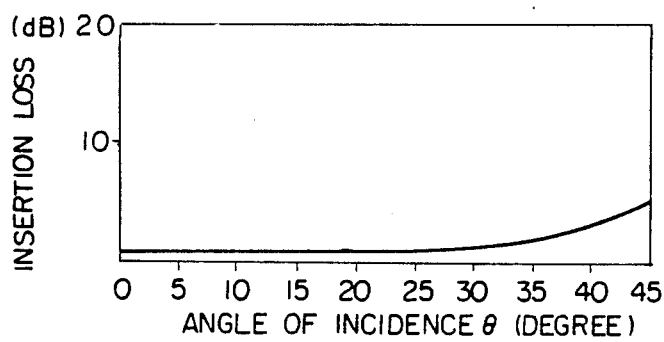
FIG. 7 shows the curve between the angle of incidence and the insertion loss at the center wave-length of the filter in FIG. 4.

FIG. 7 illustrates an example of the relationship between the insertion loss and the angle of incidence $\theta$ at the center wavelength $\lambda_0$ of the bandpass filter.

Figure 8:
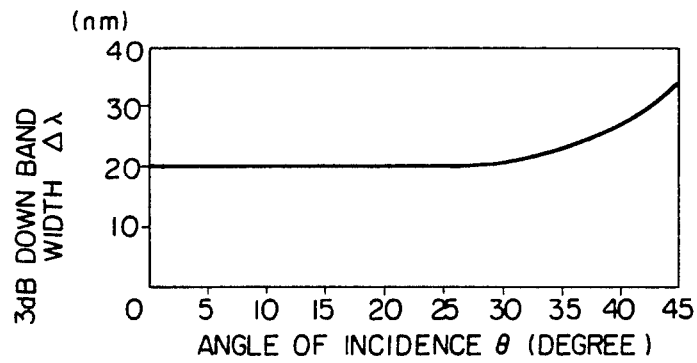
FIG. 8 shows the relationship between the angle of incidence and the 3-dB down wavelength width (that is, the half width) of the filter in FIG. 4.

FIG. 8 depicts an example of the relationship between the half width $\Delta\lambda$ of the bandpass filter and the angle of incidence.

From these examples, the following can be identified. In FIGS. 6, 7 and 8, when the angle of incidence $\theta$ is selected at less than about 20°, the transmissivity $T_0$ at the center wavelength $\lambda_0$ and the half width $\Delta\lambda$ remain the same as those in the case of perpendicular incidence ($\theta = 0°$), although only the center wavelength $\lambda_0$ is shifted to the shorter wavelength side.

Figure 9:
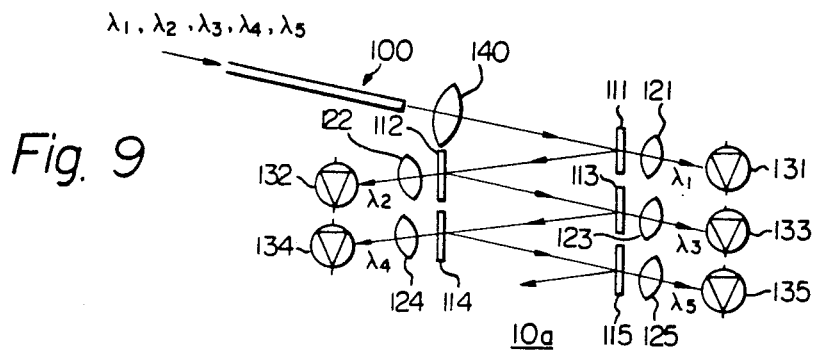
FIG. 9 is the basic configuration of the present optical demultiplexer.

FIG. 9 illustrates an embodiment of the demultiplexer according to the present invention. In FIG. 9, the demultiplexer 10a comprises a plurality of dielectric thin film filters 111, 112, 113, 114 and 115 the structure of which is shown in FIG. 4, a plurality of condenser lenses 121, 122, 123, 124 and 125, a plurality of photoelectric conversion elements (light detectors or sensors) 131, 132, 133, 134 and 135, and a collimating lens 140. The filter array composed of the optical filters 111, 113 and 115 is to be arranged in parallel with the other filter array composed of the optical filters 112 and 114. Among the optical signal waves to be demultiplexed, only the optical signal wave with wavelength $\lambda_1$ is transmitted through the optical filter 111, which reflects all other wavelengths. Next, the optical filter 112 transmits only the optical signal wave with wavelength $\lambda_2$ and reflects all other wavelengths. In the same manner, the optical filters 113, 114 and 115 transmit optical signal waves with wavelengths $\lambda_1$, $\lambda_2$, $\lambda_3$ respectively. Thus, the present invention separates or combines wavelengths through an array of a plurality of filters with different pass bands.

Now, the operation of the present invention will be described in detail.

Supposing that optical signal waves composed of different wave lengths $\lambda_1$, $\lambda_2$, $\lambda_3$, $\lambda_4$, $\lambda_5$ are emitted from the optical fiber 100, and are collimated through the collimator lens 140, then, the collimated light beam enters the optical filter 111. According to the characteristics of the optical filter 111, the optical signal wave with wavelength $\lambda_1$ is transmitted through the optical filter 111, while optical signal waves of other wavelengths are reflected and enter the optical filter 112, the optical signal wave with wavelength $\lambda_1$ which is transmitted through the optical filter 111 is converged by the condenser lens 121 onto the light detector 131. Similarly, among the light beams that entered into the optical signal wave with wavelength $\lambda_2$ transmits through the optical filter 112 and is collimated by the condenser lens 112, which illuminates the light detector 132. The optical signal waves with other wavelengths are reflected by the filter 112 and enter the optical filter 113. Similarly, all other optical signal waves are separated in sequence by the optical filters. Although the embodiment of FIG. 9 consists of five optical filters, by addition of filters of difference transmission wave length bands, many more optical signal waves can of course be filtered.

Figure 10:
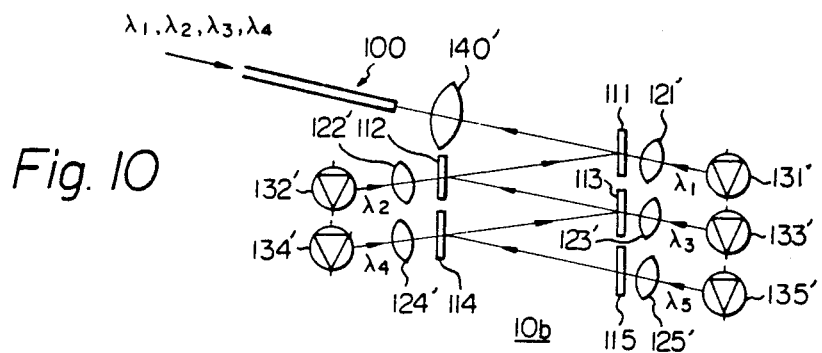
FIG. 10 is the basic configuration of the optical multiplexer according to the present invention.

FIG. 10 shows an embodiment of an optical multiplexer 10b, in which the signal light sources 131', 132', 133', 134' and 135' generate the signals of the wavelengths $\lambda_1$, $\lambda_2$, $\lambda_3$, $\lambda_4$, $\lambda_5$ respectively. The collimating lenses 121', 122', 123' 124' and 125' provide parallel light beams relating the corresponding light sources, and the condenser lens 140' connects the multiplexed optical signals to the optical fiber 100. In this process, the optical signal wave with wavelength $\lambda_1$ passes through the optical filter 111, collimated by the condenser lens 140' and is introduced into the optical fiber 100. The optical signal wave with wavelength $\lambda_2$ passes through the optical filter 112, is reflected by the optical filter 111, is collimated by the condenser lens 140', and is introduced into the optical filter 100. Similarly, the light beams with wavelengths $\lambda_3$, $\lambda_4$, and $\lambda_5$ are introduced into the optical fiber 100.

Figure 11:
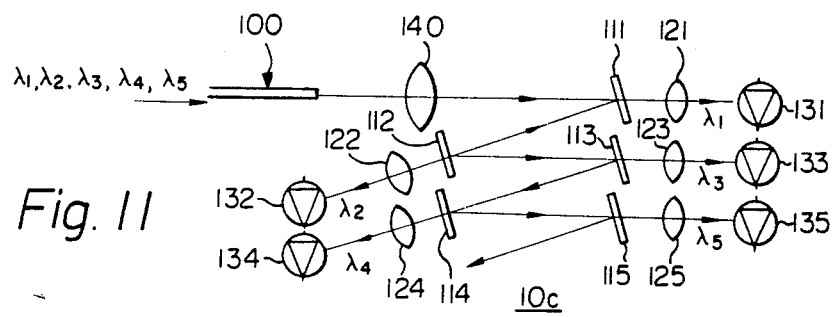
FIG. 11 is another configuration of the present optical demultiplexer.

FIG. 11 illustrates a modified configuration of the present demultiplexer 10c which the optical filters are not arranged on one straight line. Instead, each filter is placed at an angle with reference to the positioning line. With this arrangement, the multiplexing and/or the demultiplexing can be performed in the same manner as the configuration in FIGS. 9 and 10.

Figure 12:
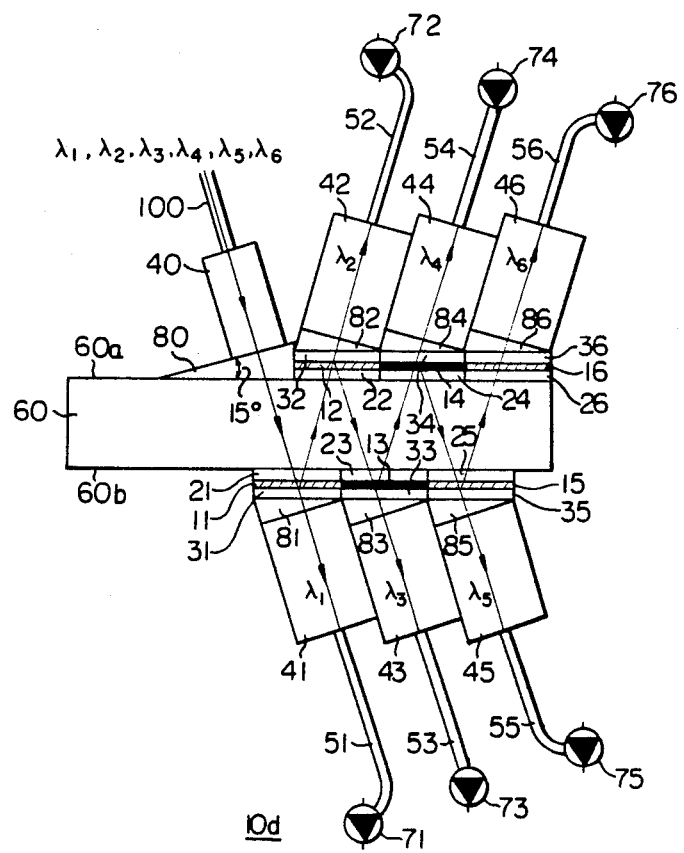
FIG. 12 shows the detailed structure of the present optical demultiplexer.

FIG. 12 shows the detailed structure of the optical demultiplexer 10d according to the present invention. In the figure, the reference numerals 11, 12, 13, 14, 15 and 16 are dielectric thin film optical band pass filters, 21, 22, 23, 24, 25 and 26 are glass plates for supporting optical band pass filters 31, 32, 33, 34, 35 and 36 are glass protectors for protecting optical band pass filters, 40 is a graded index rod lens for collimating light from an optical fiber, 41, 42, 43, 44, 45 and 46 are graded index rod lenses for condensing light beams, 51, 52, 53, 54, 55 and 56 are optical fibers for guiding the demultiplexed light to the light detectors or the sensors, 60 is a transparent common substrate having parallel planes 60a and 60b, 71, 72, 73, 74, 75 and 76 are light detectors or sensors, 80, 81, 82, 83, 84, 85 and 86 are prisms for coupling the oblique incident light beam to optical filters, and 100 is an optical fiber in a transmission line. It should be appreciated that the vertical angle of the prisms 80 through 86 is the same as the angle of incidence of the optical beams to the optical filters, and said angle is, in the present embodiment, 15 degrees. A series of filters comprising the optical band pass filters 11, 13 and 15 and another series of filters comprising the optical band pass filters 12, 14 and 16 are lined up on both of the parallel surfaces 60a and 60b of the common substrate 60. Further it should be appreciated that the refraction indices of the glass plates 21, 22, 23, 24, 25 and 26, the glass protections 31, 32, 33, 34, 35 and 36, graded index rod lenses 40, 41, 42, 43,44,45 and 46, the common substrate 60, and the optical fibers 51,52,53,54,55,56 and 100 are approximately equal. Since these components are mutually connected with optical contact and their refraction indices are approximately equal, the reflection at the interface junction of the components is negligibly small. Further, since the center wavelength of the band-pass optical filter 11 is $\lambda_1$, a light beam with wavelength $\lambda_1$ passes through the band-pass optical filter 11. However, other wavelengths $\lambda_2$, $\lambda_3$, $\lambda_4$, $\lambda_5$, $\lambda_6$ which are sufficiently apart from the wavelength $\lambda_1$ are reflected by the filter 11. Similarly the center wavelengths of the optical band-pass flters 12, 13, 14 and 15 are $\lambda_2$, $\lambda_3$, $\lambda_4$, $\lambda_5$, $\lambda_6$ respectively and reflect light beams which are apart from the respective center wavelengths. The vertical angle of the prisms 80,81,82,83,84, and 85 is 15° in the present embodiment.

Now the operation of the device in FIG. 12 is described. When light waves with different wavelengths $\lambda_1, \lambda_2, \lambda_3, \lambda_4, \lambda_5, \lambda_6$ are applied to the rod lens 40 from the optical fiber 100, these light waves are collimated to parallel beams and enter the optical band-pass filter 11 with the oblique incidence angle defined by the vertical angle of the prisms 80 through 86. The angle of incidence to the filters in this embodiment is 15°. According to the characteristics of the optical band-pass filter 11, a light wave with the wavelength $\lambda_1$ is transmitted through the optical band-pass filter 11. Other waves are reflected by the optical band-pass filter 11 and enter to the second optical band-pass filter 12 through the glass plate 21, the common substrate 60 and the glass plate 22. The wavelength $\lambda_1$ which transmits the filter 11, passes through the prism 81, and the rod lens 41, and enters the optical fiber 51, which guides the light wave of the wavelength $\lambda_1$ to the sensor 71. Thus, the electrical signal relating to the wavelength $\lambda_1$ is obtained at the output of the sensor 71. Next, among the light beams which are reflected by the optical band-pass filter 11 and enter the second optical band-pass filter 12, only the light wave with the wavelength $\lambda_2$ is transmitted by the second optical band-pass filter 12, through the prism 82, rod lens 42 and the optical fiber 52 is applied to the sensor 72. Thus, the sensor 72 provides the electrical signal relating the wavelength $\lambda_2$ at the output of the sensor 72. The light beams with wavelengths $\lambda_3, \lambda_4, \lambda_5, \lambda_6$ are reflected by the second optical band-pass filter 12 and enter the third optical band-pass filter 13 through the glass plate 22, the common substrate 60 and the glass plate 23. Similarly, the light waves with different wavelengths are separated in sequence through the optical band-pass filters 13, 14, 15 and 16. Although an embodiment with six optical band-pass filters is disclosed in FIG. 12, many more light waves can be demultiplexed with arrangements of many more filters of different center wavelengths.

Figure 13:
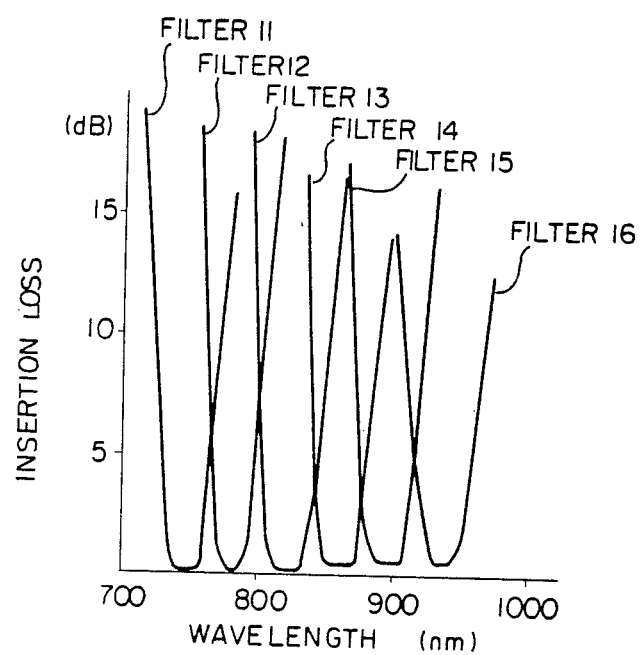
FIG. 13 shows the characteristics of the demultiplexer shown in FIG. 12.

FIG. 13 illustrates an example of the demultiplexing characteristics of the demultiplexer 10d in FIG. 12. In the figure, the horizontal axis indicates wavelength and the vertical axis shows the insertion loss provided in passing through the optical band-pass filters 11 through 16. Said insertion loss is defined by the following formula;

$$-10 \log \left\{ \frac{\text{(output power from a specified filter)}}{\text{(input power to the demultiplexer)}} \right\}$$

It should be appreciated from FIG. 13 that the light waves of center wavelengths from respective filters are emitted with low loss, but the light waves with wavelengths apart from the center wavelengths are substantially not emitted.

The embodiment illustrated in FIG. 12 is an example of demultiplexer, and it should be appreciated that the same arrangement as that in FIG. 12 can be used as an optical multiplexer which combines a plurality of wavelengths to a single optical fiber.

Figure 14:
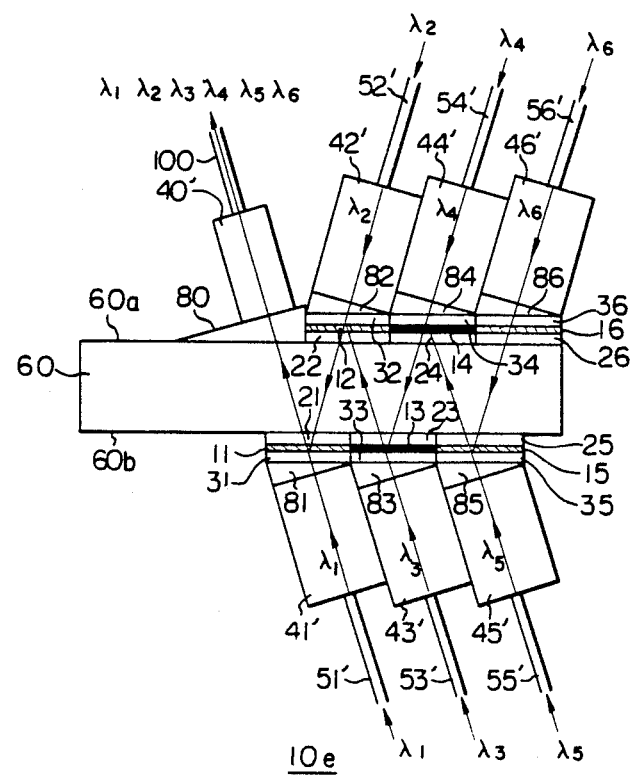
FIG. 14 shows the detailed structure of the present optical multiplexer.

FIG. 14 shows an embodiment of the present invention used as an optical multiplexer. In the figure, the reference numeral 40' is the rod lens for coupling an optical beam from the transmission optical fiber 100 to the multiplexer; 41', 42', 43', 44', 45' and 46' are rod lenses which collimate output from the optical fibers to parallel beams, 51', 52', 53', 54', 55', 56' are optical fibers which guide light waves to be multiplexed, and those optical fibers 51', 52', 53', 54', 55' and 56' guide the light waves having the wavelengths $\lambda_1, \lambda_2, \lambda_3, \lambda_4, \lambda_5, \lambda_6$, respectively. Those waves are collimated to parallel beams through the rod lenses 41', 42', 43', 44', 45' and 46', respectively, and the collimated beams are applied to the common substrate 60 at an oblique incident angle through optical band-pass filters. Those collimated beams propagate in the opposite direction to that when they propagate in the case of FIG. 12, and the collimated beams enter into the rod lens 40', which couples the multiplexed beams to the transmission optical fiber 100.

As an example, the light wave with wavelength $\lambda_2$ guided by the optical fiber 52' is described in the following explanation. The light wave from the optical fiber 52' is collimated to a parallel beam by the collimating rod lens 42' and then is applied to the optical band-pass filter 11 with an oblique incident angle through the prism 82, the optical band-pass filter 12 and the common substrate 60. On the other hand, the light beams of the wavelengths $\lambda_3, \lambda_4, \lambda_5, \lambda_6$ which are applied to the optical band-pass filter 12 from the bottom in FIG. 14 are reflected by the optical band-pass filter 12, and along with the light beam having the wavelength $\lambda_2$, those reflected beams enter into the optical band-pass filter 11. Those beams which are applied to the optical band-pass filter 11 are reflected by the optical band-pass filter 11, which also transmits the wavelength $\lambda_1$. The output beams from the optical band-pass filter 11 are coupled with the transmission optical fiber 100 through the prism 80, and the rod lens 40'.

Figure 15:
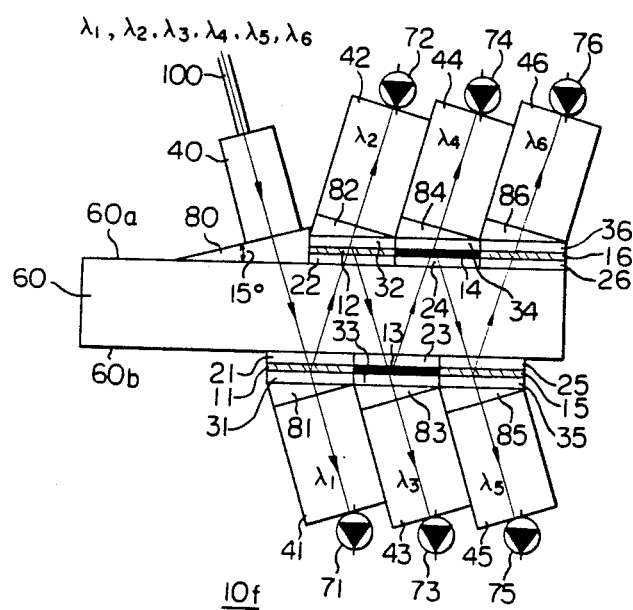
FIG. 15 shows the detailed structure of another embodiment of the present optical demultiplexer.

FIG. 15 illustrates another embodiment of the present multiplexer/demultiplexer according to the present invention. The same reference numerals are given to the components which have been illustrated in FIG. 12. The important feature of this embodiment is that the demultiplexed beams do not enter an optical fiber, but are applied directly to the light detectors or sensors 71, 72, 73, 74, 75, and 76 through the rod lenses 41, 42, 43, 44, 45, 46.

Figure 16:
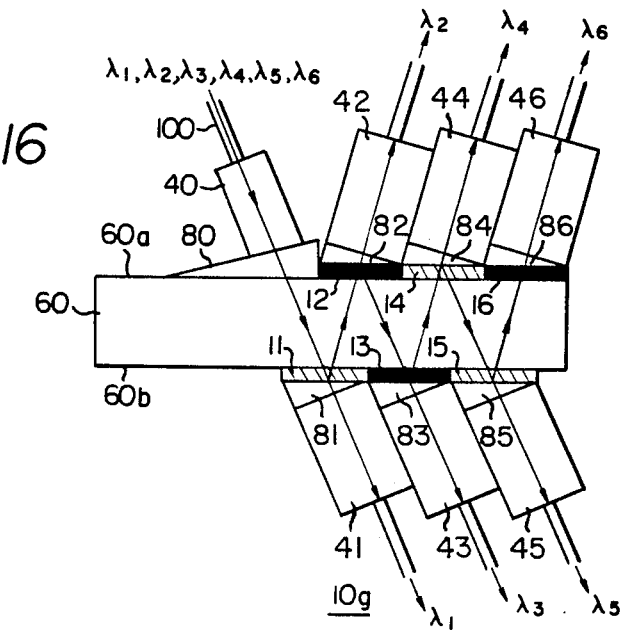
FIG. 16 shows the detailed structure of still another embodiment of the present optical demultiplexer.

FIG. 16 illustrates another embodiment of the present multiplexer/demultiplexer according to the present invention. The basic performance of this embodiment in FIG. 16 is the same as that of the embodiments in FIG. 12 and FIG. 14. The important feature of FIG. 16 is that the dielectric thin film filters 11, 12, 13, 14, 15 and 16 having a bandpass property are attached directly to the surface of the prisms 81, 82, 83, 84, 85, 86 or on the surface of the common substrate 60 through a vacuum evaporation or sputtering process. Therefore, no glass plate or glass protection is provided in the embodiment in FIG. 16.

It should be noted as indicated in FIG. 6, that the center wavelength $\lambda_0$ of an optical band-pass filter can be adjusted by controlling the angle of incidence of the input light beam. By utilizing this characteristic, when the center wavelength of an optical band-pass filter has some deviation from the desired value because of an error in the manufacturing process, fine adjustment of the center wavelength of a band-pass optical filter is possible.

Figure 17:
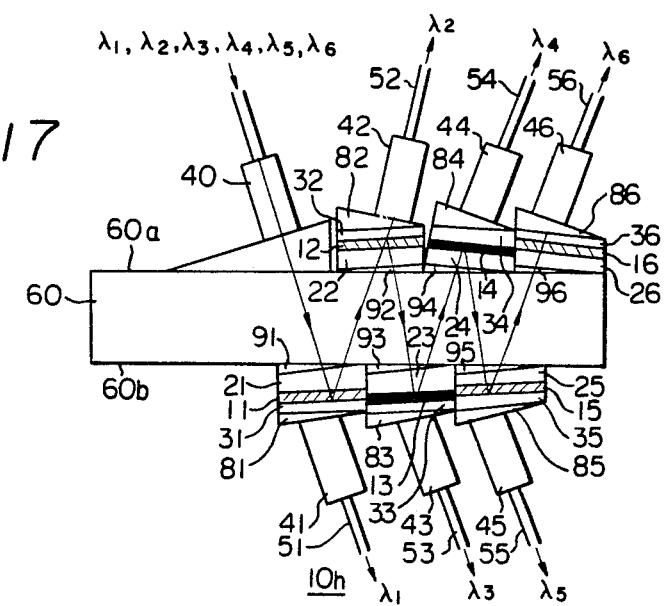
FIG. 17 shows the detailed structure of still another embodiment of the present optical demultiplexer.

FIG. 17 illustrates still another embodiment of the present multiplexer/demultiplexer which can perform the fine adjustment of the center wavelength utilizing the above characteristics. The same reference numerals as those in FIG. 12 are used for those elements in FIG. 17. The important feature of the embodiment in FIG. 17 is the presence of the second group of prisms 91, 92, 93, 94, 95 and 96 for the fine adjustment of the angle of incidence. The vertical angles of these prisms 91, 92, 93, 94, 95 and 96 are designed so that the respective optical band-pass filters 11, 12, 13, 14, 15, 16 shall have optimum angles of incidence. The sum of the vertical angles of the first group of prisms and the second group of prisms is substantially equal to the angle of incidence of a light beam to optical filters. It should be appreciated in the embodiment of FIG. 17, that the diameter of each optical band-pass filter is sufficiently larger than the diameter of an applied optical beam so that an optical beam does not extend beyond an optical filter when an angle of incidence is changed.

In the embodiment in FIG. 17, even if the center wavelengths of the optical band-pass filters 11, 12, 13, 14, 15, and 16 have a small deviation due to the manufacturing error from the desired center wavelengths $\lambda_1$, $\lambda_2$, $\lambda_3$, $\lambda_4$, $\lambda_5$, $\lambda_6$, such errors can be compensated for by adjusting the angle of incidence of an optical beam utilizing compensation prisms 91, 92, 93, 94, 95, and 96. Further, since the diameter of the optical band-pass filters is sufficiently large, the multiplexing and/or demultiplexing operation is not disturbed even when the angle of incidence of an input light beam changes from the designed angle of incidence.

As described above, a multiplexer and/or a demultiplexer according to the present invention has the advantages listed below.

(a) Light beams do not propagate in the air because those elements are optically contacted each other.
(b) Thus, an optical multiplexer/demultiplexer free from external thermal disturbances and mechanical vibrations can be arranged, and its size is readily reducible.
(c) Multiple signal waves can be multiplexed or demultiplexed with small loss by arranging the optical filters in an array.
(d) The signal waves with narrow wavelength spacing can be multiplexed or demultiplexed through the use of the optical band-pass filters.
(e) The characteristics of the device can be adjusted by adjusting the angle of incidence of light beam going into the optical band-pass filters.
(f) Further, without providing an anti-reflection coating on individual components, a low loss multiplexer or demultiplexer whose size is readily reducible can be formed, because the optical fibers, the lenses, the dielectric thin film filters, and the common substrate have the same refractive index.

From the foregoing it will now be apparent that a new and improved optical multiplexer and/or demultiplexer has been found. It should be understood of course that the embodiments disclosed are merely illustrative and are not intended to limit the scope of the invention. Reference should be made to the appended claims, therefore, rather than the specification as indicating the scope of the invention.

Finally the major reference numerals and symbols utilized in the specification are listed below.

| | |
|---|---|
| 1,2,1',2',1'',2'': | graded index rod lens |
| 3,3',3'': | interference film filter |
| 5,6,7: | position |
| 10a,10b,10c,10d,10e,10f,10g,10h: | optical multiplexer/ |
| MUL, DE-MUL | demultiplexer |
| 11,12,13,14,15,16: | dielectric thin film filter |
| 21,22,23,24,25,26,S$_1$: | glass plate |
| 31,32,33,34,35,36,S$_2$: | glass protection |
| 40,41,42,43,44,45,46: | graded index rod lens |
| 40',41',42',43',44',45',46': | |
| 51,52,53,54,55,56: | optical fiber |
| 51',52',53',54',55',56': | |
| 60: | substrate |
| 60a,60b: | parallel planes of the substrate 60 |
| 71,72,73,74,75,76: | light detector |
| 80,81,82,83,84,85,86: | prism |
| 91,92,93,94,95,96: | |
| 100,101,102: | optical fiber |
| 111,112,113,114,115: | dielectric thin film filter |
| 121,122,123,124,125: | collimating lens |
| 121',122',123',124',125': | |
| 131,132,133,134,135: | light detector |
| R$_1$, R$_2$, R$_n$: | |
| 131',132',133',134',135': | light source |
| T$_1$, T$_2$, T$_n$: | |
| 140,140': | collimating lens |
| F$_1$, F$_2$: | $\lambda/4$ thin film |
| F$_3$: | $\lambda/2$ thin film |
| $\lambda_1, \lambda_1', \lambda_2, \lambda_2', \lambda_3, \lambda_4, \lambda_5, \lambda_6$: | wavelength |

What is claimed is:

1. An optical multiplexer comprising a plurality of flat optical filter means, each of which transmits a different predetermined wavelength and reflect other wavelengths, said optical filter means being arranged substantially in a pair of spaced parallel rows, the filter means in the first row being staggered in relation to the corresponding filter means in the second row so that an optical beam is transmitted or reflected by the optical filter means in sequence; an optical means provided behind each of said optical filter means to provide a parallel optical beam from an optical source to each of said optical filter means with a small angle of incidence, and another optical means provided at the output of the final optical filter means to connect the output optical beam to an optical fiber.

2. An optical multiplexer according to claim 1, wherein said optical filter means is a dielectric thin film filter having a bandpass property.

3. An optical multiplexer according to claim 1, further comprising means for adjusting the angle of incidence of a light beam to the optical filter means to control the center wavelength of each optical filter means, said adjusting means being provided for each optical filter means.

4. An optical demultiplexer comprising a plurality of flat optical filter means each of which transmits a different predetermined wavelength and reflects other wavelengths, said optical filter means being arranged substantially in a pair of spaced parallel rows, the filter means in the first row being staggered in relation to the corresponding filter means in the second row so that an optical beam is transmitted or reflected by said optical filter means in sequence; an optical means for applying a collimated input optical beam to each of said optical filter means with a small angle of incidence; and another optical means confronting each of said optical filter means to receive and focus the transmitted beam from each optical filter means for illuminating a light detector.

5. An optical demultiplexer according to claim 4, wherein said optical filter means is a dielectric thin film filter having a bandpass property.

6. An optical demultiplexer according to claim 4, further comprising means for adjusting the angle of incidence of a light beam to the optical filter means to control the center wavelength of each optical filter means, said adjusting means being provided for each optical filter means.

7. An optical multiplexer comprising a transparent dielectric substrate having first and second parallel planes, a first group of optical filters positioned linearly on said first plane, a second group of optical filters positioned linearly on the second plane and staggered in relation to the corresponding filters on the first plane, projecting means for projecting collimated optical beams to each of said optical filters at a predetermined angle of incidence, and coupling means provided at the output of the final optical filter to connect the output optical beam to an outside optical fiber, wherein each said optical filter transmits a wave having a different predetermined wavelength and reflects waves having other wavelengths.

8. An optical multiplexer according to claim 7, wherein said projecting means for projecting collimated optical beams to each of the optical filters at a predetermined angle of incidence includes a prism.

9. An optical multiplexer according to claim 7, wherein the angle of incidence is approximate 15°.

10. An optical multiplexer according to claim 7, wherein said optical filters are directly attached to the parallel surfaces of the substrate.

11. An optical multiplexer according to claim 7, wherein all the optical elements provided in the path of the light beam are in optical contact so that the optical beam does not pass through air.

12. An optical multiplexer according to claim 7, wherein all the optical elements provided along the path of the light beam have approximately the same refractive index as each other so that the light beam does not reflect at the contact surface of two elements.

13. An optical multiplexer according to claim 7, further comprising a second prism inserted between the substrate and each optical filter for adjusting the angle of incidence.

14. An optical demultiplexer comprising a transparent dielectric substrate having first and second parallel planes, a first group of optical filters positioned linearly on said first plane, a second group of optical filters positioned linearly on the second plane and staggered in relation to the corresponding filters on the first plane, projecting means for projecting the collimated optical beam to the first optical filter at a predetermined angle of incidence, and at least one light detector provided behind each optical filter, wherein each said optical filter transmits a wave having a different predetermined wavelength and reflects waves having other wavelengths.

15. An optical demultiplexer according to claim 14, wherein said projecting means for projecting the collimated optical beam to the first optical filter at a predetermined angle of incidence includes a prism.

16. An optical demultiplexer according to claim 14, wherein the angle of incidence is approximate 15°.

17. An optical demultiplexer according to claim 14, wherein said optical filters are directly attached to the parallel surface of the substrate.

18. An optical demultiplexer according to claim 14, wherein all the optical elements provided along the path of the light beam are in optical contact so that an optical beam does not pass through air.

19. An optical demultiplexer according to claim 14, wherein all the optical elements provided along the path of the light beam have approximately the same refractive index as each other so that the light beam does not reflect at the contact surface of two elements.

20. An optical demultiplexer according to claim 14, further comprising a second prism inserted between the substrate and each optical filter for adjusting the angle of incidence.

* * * * *